US008397174B2

(12) United States Patent
Kubota et al.

(10) Patent No.: US 8,397,174 B2
(45) Date of Patent: Mar. 12, 2013

(54) ORDER RECEIVING APPARATUS AND ORDER RECEIVING METHOD

(75) Inventors: Takahide Kubota, Shizuoka (JP); Yumiko Okuma, Tokyo (JP); Masanori Sambe, Shizuoka (JP); Hisashi Sato, Shizuoka (JP); Takashi Makiyama, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 291 days.

(21) Appl. No.: 12/755,704

(22) Filed: Apr. 7, 2010

(65) Prior Publication Data

US 2010/0262934 A1 Oct. 14, 2010

(30) Foreign Application Priority Data

Apr. 8, 2009 (JP) ................... 2009-094199

(51) Int. Cl.
*G06F 3/048* (2006.01)
(52) U.S. Cl. .................. 715/798; 715/800; 715/801
(58) Field of Classification Search .................. 715/798, 715/810, 800, 801
See application file for complete search history.

(56) References Cited

U.S. PATENT DOCUMENTS

2001/0047302 A1 11/2001 Yoshinaga et al.
2007/0265935 A1* 11/2007 Woycik et al. .................. 705/26
2009/0167553 A1* 7/2009 Hong et al. ............... 340/825.29
2009/0259559 A1* 10/2009 Carroll et al. .................... 705/17

FOREIGN PATENT DOCUMENTS

| CN | 1165351 | 11/1997 |
|----|---------|---------|
| JP | 10-063955 | 3/1998 |
| JP | 10-255167 | 9/1998 |
| JP | 2002-055752 | 2/2002 |
| JP | 2008-059257 | 3/2008 |
| JP | 2008299821 | 12/2008 |

OTHER PUBLICATIONS

Japanese Office Action for Application No. 2009-094199 mailed on Mar. 1, 2011.
Chinese Office Action for Application No. 201010141885.9 mailed on Oct. 19, 2012.

* cited by examiner

*Primary Examiner* — Weilun Lo
*Assistant Examiner* — Truc Chuong
(74) *Attorney, Agent, or Firm* — Turocy & Watson, LLP (57) ABSTRACT

An order receiving apparatus includes: a receiving unit configured to receive selection of a task other than an order task related to an order of a menu item; and a display control unit configured to display an order input screen including an area in which an operation image for operating execution of the order task is displayed and an area in which an operation image for operating execution of the task, the selection of which is received, is displayed.

7 Claims, 9 Drawing Sheets

| SECTION NUMBER | SECTION | TAG POSITION | REMARKS |
|---|---|---|---|
| 01 | DRINK | 9 | |
| 02 | DESSERT | 8 | |
| 03 | WAZEN | 1 | |
| 04 | WAYOSYOKU | 2 | |
| 05 | DONMONO | 4 | |
| 06 | NABEMONO | 5 | |
| 07 | UDON & SOBA | 6 | |
| 08 | IPINRYOURI | 7 | |
| 09 | KENSAI AND SALAD | 3 | |

FIG.7

| CODE | SECTION | ALLOCATION | IMAGE | MENU NAME | UNIT PRICE | TAKE OUT | SERVICE CHARGE IMPOSED | KP1 TO 4 | BUTTON COLOR |
|---|---|---|---|---|---|---|---|---|---|
| 0001 | 01 | 1 |  | BLENDED COFFEE | 350 | OK | ○ |  |  |
| 0002 | 01 | 2 |  | ICED COFFEE | 350 | OK | ○ |  |  |
| 0003 | 01 | 3 |  | WEAK COFFEE L | 350 | OK | |  |  |
| 0004 | 01 | 4 | | ESPRESSO | 500 | OK | ○ |  |  |
| 0005 | 01 | 5 |  | COFFEE OF THE DAY | 300 | OK | ○ |  |  |
| 0006 | 01 | |  | CAFÉ LA THE | 420 | OK | |  |  |
| 0007 | 01 | |  | CAFÉ LA THE L | 460 | OK | ○ |  |  |
| 0008 | 01 | | | TEA WITH LEMON | 350 | OK | ○ |  | |
| 0009 | 01 | | | TEA WITH MILK | 350 | OK | ○ |  | |
| 0010 | 01 | | | HERB TEA | 300 | OK | ○ |  | |
| 0011 | 01 | | | OOLONG TEA | 250 | | |  | |
| 0012 | 01 | | | COKE | 250 | | |  | |
| 0013 | 01 | | | GINGER ALE | 250 | | |  | |

ORDER RECEIVING APPARATUS AND ORDER RECEIVING METHOD

CROSS-REFERENCE TO RELATED APPLICATION

This application claims the benefit of priority from Japanese Patent Application No. 2009-094199 filed on Apr. 8, 2009, the entire content of which is incorporated herein by reference.

TECHNICAL FIELD

The present invention relates to an order receiving apparatus and an order receiving method for executing plural tasks.

BACKGROUND

For example, in a large number of restaurants such as a family restaurant and a bar, an order management system that can centrally manage jobs from order taking to checkout for food and drink menus is installed (see JP-A-2008-299821). The system disclosed in JP-A-2008-299821 includes a checkout apparatus such as an electronic cache register or a point of sales (POS) set in a register that is a checkout place for payment, a station configured to execute, for example, management of various kinds of information transmitted from the checkout apparatus, a slip issuing printer connected to the checkout apparatus and configured to print and issue an order slip, and a kitchen printer configured to print and output a cooking instruction slip. In the system disclosed in JP-A-2008-299821, the station, the slip issuing printer, the kitchen printer, and the checkout apparatus are connected via a communication line such as a local area network (LAN).

With the checkout apparatus disclosed in JP-A-2008-299821, an operator inputs an order by touching a menu item button of a menu item space in an order input screen. When the operator executes tasks (e.g., input of office arrival time or office leaving time) other than the input of an order, the order input screen is switched to a screen for executing the other tasks. Therefore, in the checkout apparatus disclosed in JP-A-2008-299821, when the order input screen is switched to the screen for executing the other tasks, the operator cannot input an order. Therefore, operability is poor and a burden on the operator is heavy.

SUMMARY

According to an aspect of the present invention, there is provided an order receiving apparatus including: a receiving unit configured to receive selection of a task other than an order task related to an order of a menu item; and a display control unit configured to display an order input screen including an area in which an operation image for operating execution of the order task is displayed and an area in which an operation image for operating execution of the task, the selection of which is received, is displayed.

According to another aspect of the present invention, there is provided an order receiving method including: receiving selection of a task other than an order task related to an order of a menu item; and displaying an order input screen including an area in which an operation image for operating execution of the order task is displayed and an area in which an operation image for operating execution of the task, the selection of which is received, is displayed.

DETAILED DESCRIPTION

An embodiment of the present invention is explained below with reference to FIGS. 1 to 11. This embodiment is an example in which an order receiving apparatus and an order receiving method are applied to an information terminal of a customer service supporting system for supporting customer service jobs in an overall flow of customer service for guiding a customer who visits a restaurant to a table set in a customer service floor, taking an order, and serving the customer with food.

Figure 1:
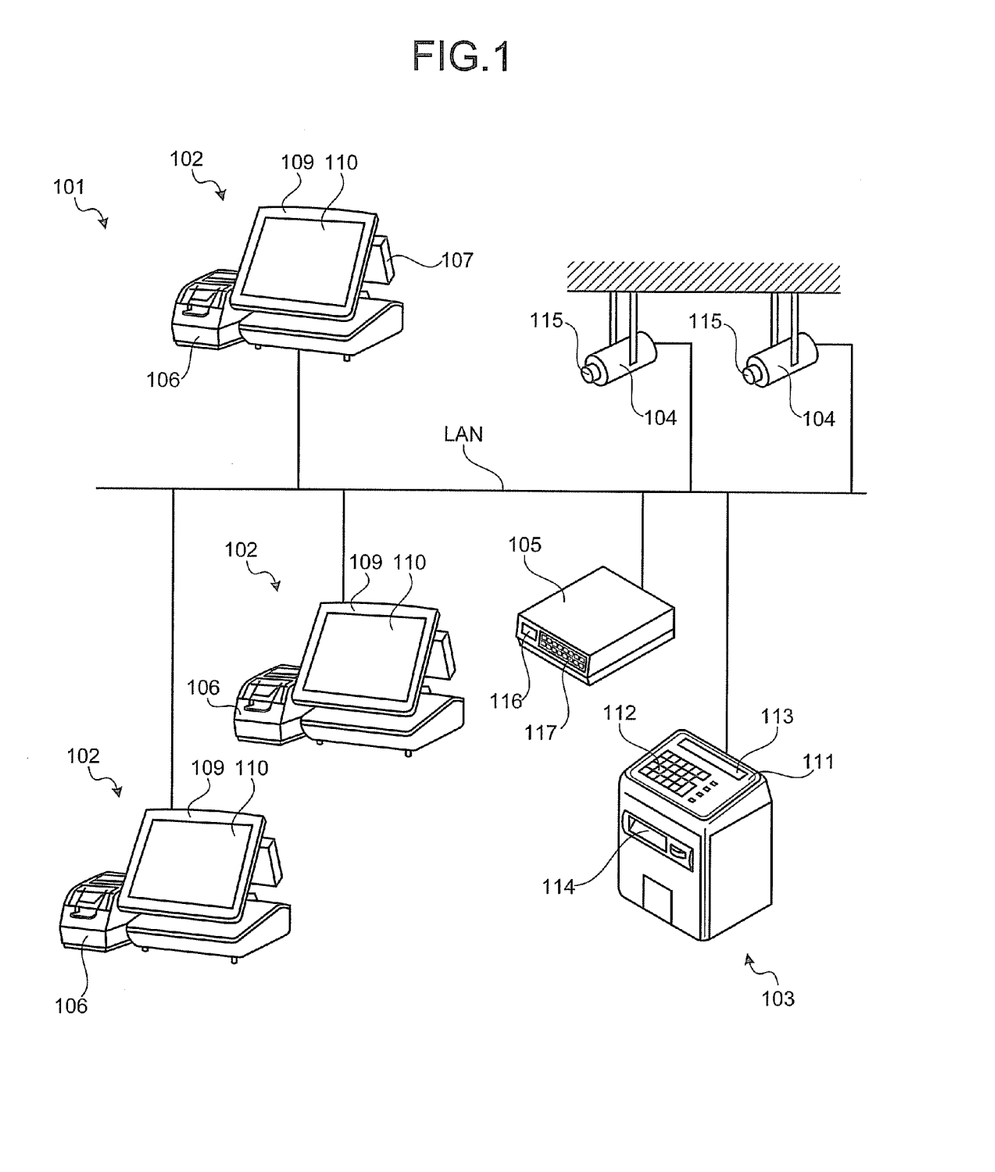
FIG. 1 is a schematic system diagram of the overall configuration of a customer service supporting system.

FIG. 1 is a schematic system diagram of the overall configuration of the customer service supporting system. A customer service supporting system 101 shown in FIG. 1 includes information terminals 102 set in a customer service floor and a checkout counter, a kitchen printer 103 set in a kitchen, live cameras 104 configured to pick up images of spaces above not-shown tables, and a station 105 as a server set in a backyard or the like of the restaurant and configured to control the entire customer service supporting system 101.

The information terminals 102 set in the customer service floor and the information terminal 102 set in the checkout counter have the same basic structure and basic functions. Only forms of use of the information terminals 102 are different. Specifically, the information terminals 102 set in the customer service floor support jobs such as a job for guiding customers, a job for receiving orders, and a job for serving customers with food. On the other hand, the information terminal 102 set in the checkout counter supports a checkout job in addition of the job for guiding customers, the job for receiving orders, and the job for serving customers with food. In other words, the information terminal 102 set in the checkout counter also functions as a so-called POS terminal. Therefore, in the customer service supporting system 101, printers 106 for issuing receipts and slips are connected to both the information terminals 102 set in the customer service floor and the information terminal 102 set in the checkout counter. On the other hand, in the customer service supporting system 101, a customer side display device 107 is also connected to the information terminal 102 set in the checkout counter in addition to the printer 106.

Figure 2:
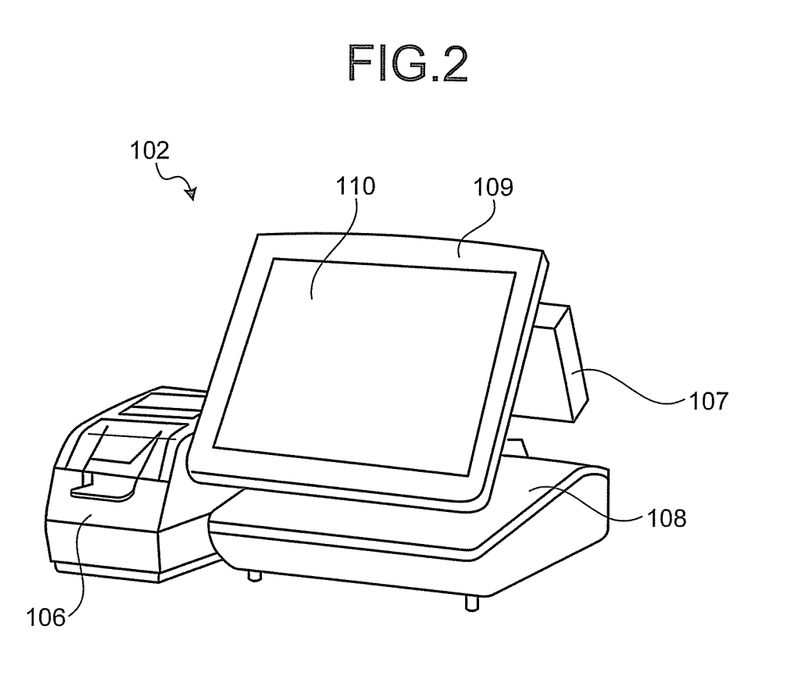
FIG. 2 is a perspective view of an external form of an information terminal viewed from the front side thereof.

FIG. 2 is a perspective view of an external form of the information terminal 102, which functions as the POS terminal, viewed from the front side thereof. The information terminal 102 includes a main body unit 108 and a liquid crystal display 109 as a display device placed on the upper surface of the main body unit 108. In the information terminal 102, a touch panel 110 as an input device is laminated and arranged on a display surface of the liquid crystal display 109. In this embodiment, a multi touch panel 110 on which an operator can simultaneously touch plural points and input data is used as the touch panel 110. In this embodiment, in the customer service supporting system 101, the printer 106 is set near the information terminal 102. The printer 106 is connected to the information terminal 102 via an interface such as a USB.

Figure 3:
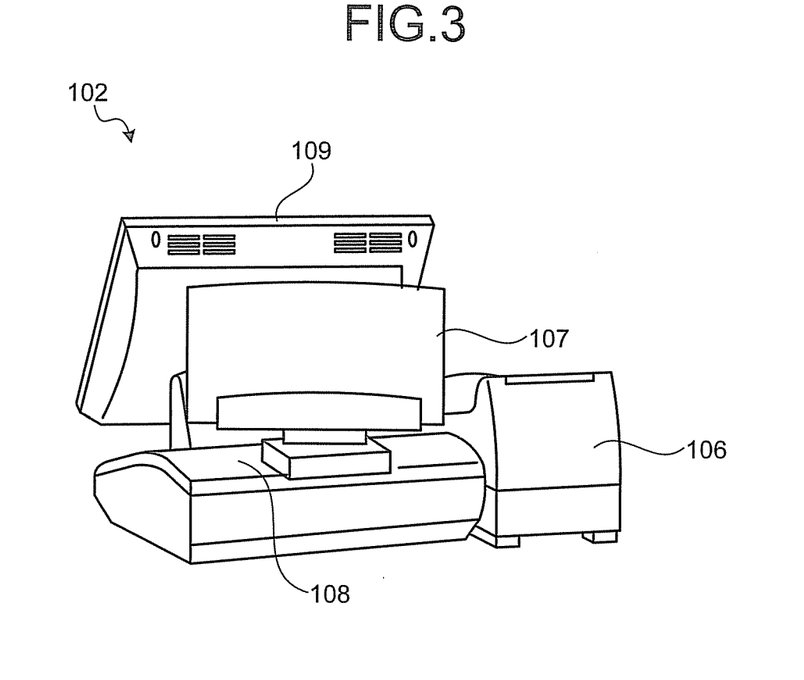
FIG. 3 is a perspective view of an external form of the information terminal viewed from the rear side thereof.

FIG. 3 is a perspective view of an external form of the information terminal 102, which functions as the POS terminal, viewed from the rear side thereof. In FIG. 3, the customer side display device 107 is clearly shown. The customer side display device 107 is, as an example, an LED display device configured to display seven segments. In the information terminal 102, the customer side display device 107 is placed on the upper surface of the main body unit 108. In this embodiment, in the customer service supporting system 101, like the printer 106, the customer side display device 107 is also connected to the information terminal 102 via an interface such as a USB.

As shown in FIG. 1, the upper surface of the kitchen printer 103 is an operation display surface 111. The operation display surface 111 includes a keyboard 112 and a display 113. The kitchen printer 103 incorporates, for example, a thermal printer (not shown). The kitchen printer 103 prints and issues a cooking instruction slip (not shown) for chefs who work in the kitchen. The kitchen printer 103 issues the cooking instruction slip from a slip issue port 114 arranged in the front.

The live cameras 104 cause images captured from lenses 115 to focus on two-dimensional CCD arrays (not shown). For example, the live cameras 104 amplify, A/D-convert, and filter outputs of the CCD arrays to output the outputs as moving images.

The live cameras 104 deliver in detail, as moving image videos, states of spaces on plural tables (not shown) arranged in the customer service floor.

The station 105 includes, as shown in FIG. 1, a small liquid crystal display 116 and a keyboard 117. The station 105 executes, for example, management of various kinds of information transmitted from the information terminals 102.

In the customer service supporting system 101 schematically explained above, the information terminals 102, the kitchen printer 103, the live cameras 104, and the station 105 are connected to be capable of transmitting and receiving data to and from one another via the LAN. The information terminals 102 can input guide information for guiding customers to the tables and order information concerning menu orders. The information terminals 102 transmit the input order information to the station 105 through the LAN. The information terminals 102 further transmit the input order information from the station 105 to the kitchen printer 103 through the LAN. The kitchen printer 103 prints and issues a slip including content corresponding to the received order information. The slip printed and issued by the kitchen printer 103 is, as explained above, the cooking instruction slip for instructing the cooks in the kitchen about ordered menu items. The information terminal 102 functioning as the POS terminal executes checkout processing.

Figure 4:
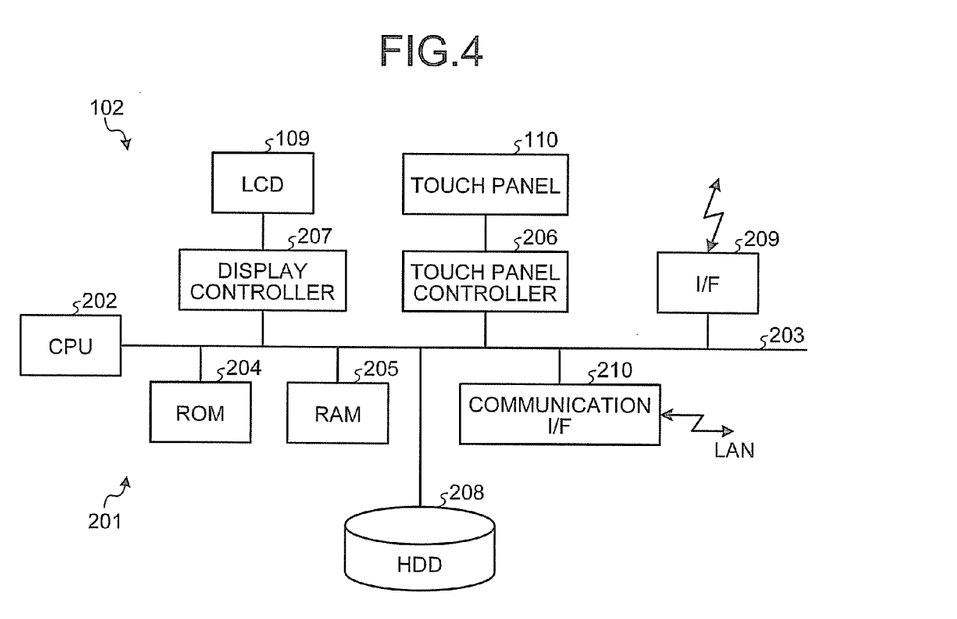
FIG. 4 is a block diagram of electric connection of the information terminal.

FIG. 4 is a block diagram of electric connection of the information terminal 102. As shown in FIG. 4, the information terminal 102 includes a microcomputer 201. The microcomputer 201 controls to drive the units of the information terminal 102. In the microcomputer 201, a read only memory (ROM) 204 having stored therein fixed information such as a control program in advance and a random access memory (RAM) 205 configured to rewritably store various kinds of information and function as a work area or the like are connected to, via a bus line 203, a central processing unit (CPU) 202 configured to centrally control the units. Therefore, the microcomputer 201 configures an information processing unit configured to execute information processing.

In the information terminal 102, a touch panel controller 206, a display controller 207, a hard disk drive (HDD) 208, an interface 209, and a communication interface 210 are connected to the microcomputer 201 via the bus line 203. The touch panel controller 206 captures an input signal from the touch panel 110 into the microcomputer 201. The display controller 207 displays an image corresponding to image data on the liquid crystal display 109. The interface 209 is an interface such as a USB for connecting the printer 106 and the customer side display device 107 to the microcomputer 201. The communication interface 210 is an interface for causing the microcomputer 201 to perform data communication with other apparatuses via the LAN.

In the information terminal 102, an operating system (OS), a computer program, various files, and the like are installed in the HDD 208. When the information terminal 102 is started, the microcomputer 201 copies a part or all of the OS, the computer program, the various files, and the like installed in the HDD 208 to the RAM 205. The CPU 202 accesses the various files and the like copied to the RAM 205. The CPU 202 operates according to the OS and the computer program copied to the RAM 205.

Figure 5:
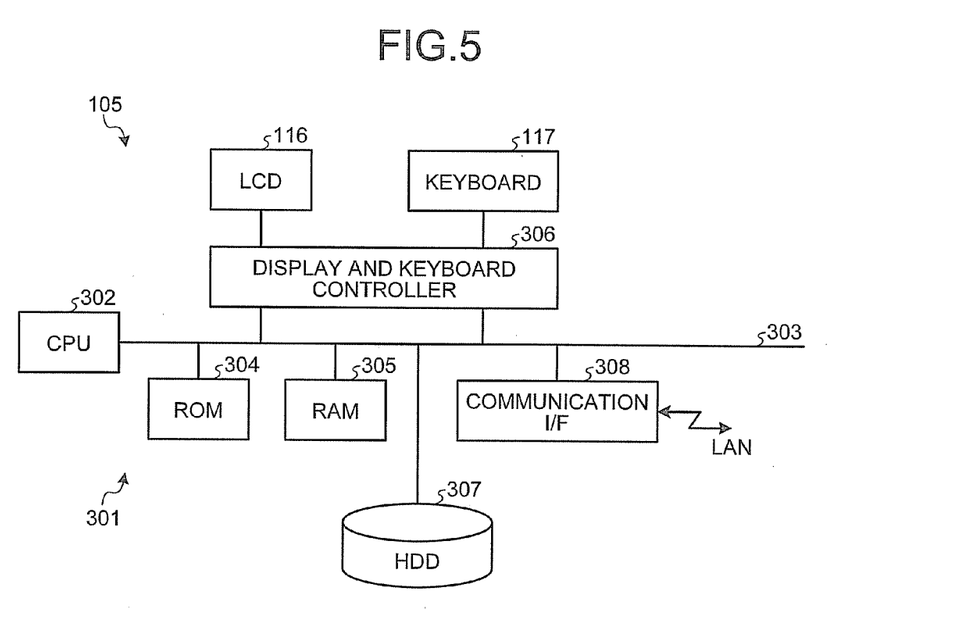
FIG. 5 is a block diagram of electric connection of a station.

FIG. 5 is a block diagram of electric connection of the station 105. As shown in FIG. 5, the station 105 includes a microcomputer 301. The microcomputer 301 controls to drive the units of the station 105. In the microcomputer 301, a ROM 304 having stored therein fixed information such as a control program in advance and a RAM 305 configured to rewritably store various kinds of information and function as a work area or the like are connected to, via a bus line 303, a CPU 302 configured to centrally control the units. Therefore, the microcomputer 301 configures an information processing unit configured to execute information processing.

In the station 105, a display and keyboard controller 306, an HDD 307, and a communication interface 308 are connected to the microcomputer 301 via the bus line 303. The display and keyboard controller 306 displays an image corresponding to image data on the liquid crystal display 116. The display and keyboard controller 306 captures an input signal from the keyboard 117 into the microcomputer 301. The communication interface 308 is an interface for causing the microcomputer 301 to perform data communication with other apparatuses through the LAN.

In the station 105, an OS, a computer program, various files, and the like are installed in the HDD 307. The microcomputer 301 copies a part or all of the OS, the computer program, the various files, and the like installed in the HDD 307 to the RAM 305. The CPU 302 accesses the various files and the like copied to the RAM 305. The CPU 302 operates according to the OS and the computer program copied to the RAM 305.

Figure 6:
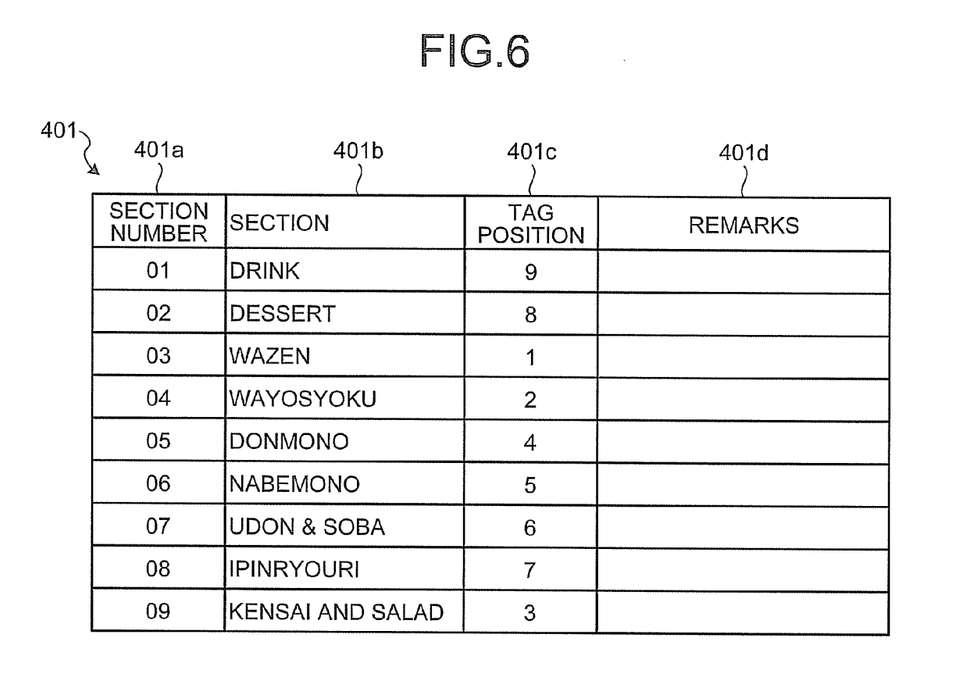
FIG. 6 is a schematic diagram of a file structure of a section file.

FIG. 6 is a schematic diagram of a file structure of a section file 401 accessible by the information terminals 102 and the station 105. In the information terminals 102 and the station 105, the section file 401 is installed in the HDD 208 of each of the information terminals 102 and the HDD 307 of the station 105. The station 105 downloads the section file 401 installed in the HDD 307 of the station 105 to the HDD 208 of the information terminal 102, for example, during record update of the section file 401 or at night after the closing time such that a discrepancy does not occur between the section file 401 installed in the HDD 208 and the section file 401 installed in the HDD 307.

In the section file 401, a section 401b, a tag position 401c, and remarks 401d are registered in association with a two-digit section number 401a. As an example, as the section number 401a, the following numbers are associated with sections:

01: drink
02: dessert
03: wazen
04: wayosyoku
05: donmono
06: nabemono
07: udon and soba
08: ipinryouri
09: kensai and salad In the section file 401, section names of sections are registered in the section 401b. In the section file 401, the arrangement of sections corresponding to section tags D11 (see FIG. 9) displayed on an order input screen D is registered in the tag position 401c. The remarks 401d column is a column in which various kinds of information can be written for, for example, information management.

Figure 7:
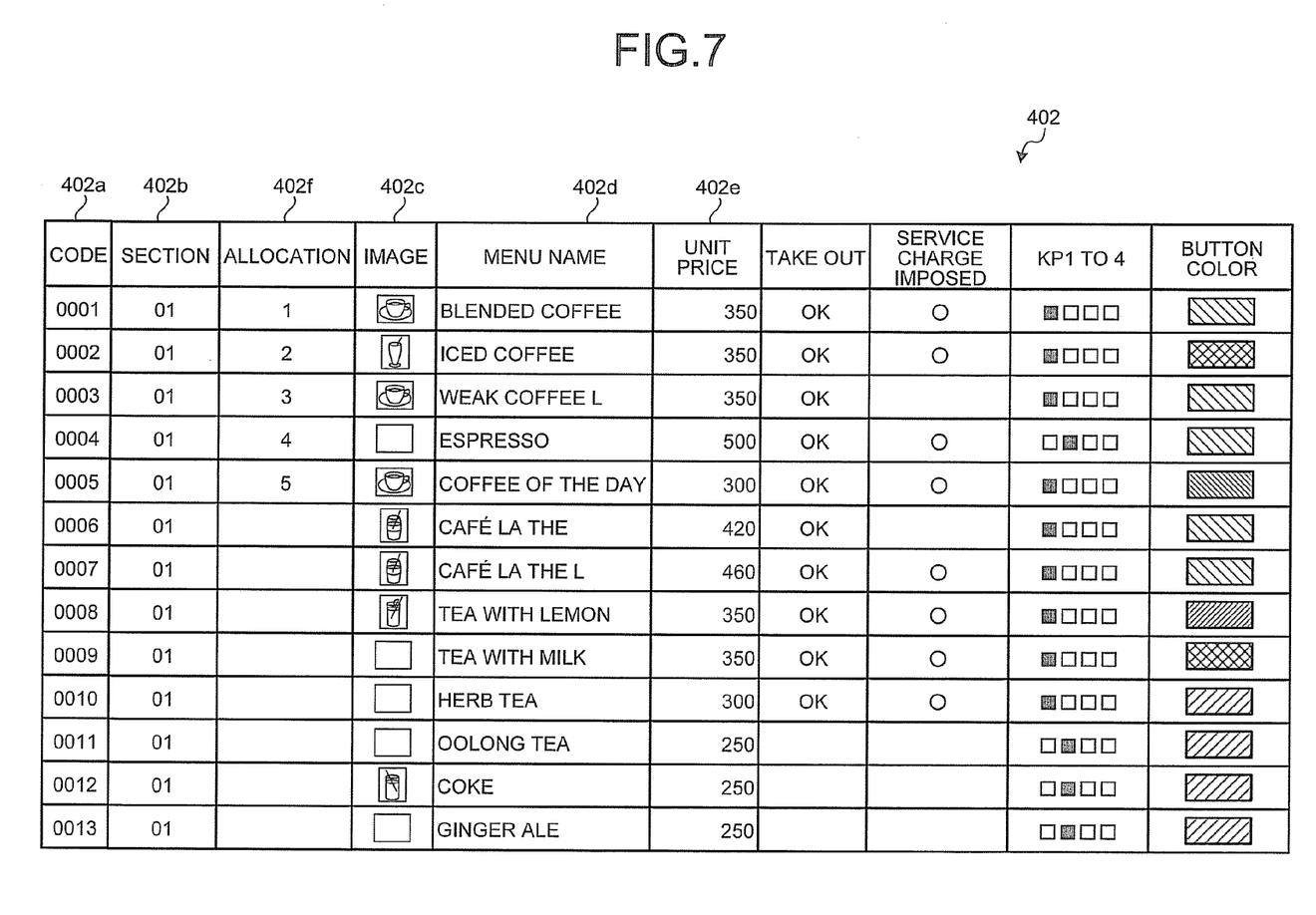
FIG. 7 is a schematic diagram of a file structure of a PLU file.

FIG. 7 is a schematic diagram of a file structure of a PLU file 402 accessible by the information terminal 102 and the station 105. In the information terminals 102 and the station 105, the PLU file 402 is installed in the HDD 208 of each of the information terminals 102 and the HDD 307 of the station 105. The station 105 downloads the PLU file 402 installed in the HDD 307 of the station 105 to the HDD 208 of the information terminal 102, for example, during record update of the PLU file 402 or at night after the closing time such that a discrepancy does not occur between the PLU file 402 installed in the HDD 208 and the PLU file 402 installed in the HDD 307.

In the PLU file 402, a section 402b, an image link 402c, a menu name 402d, a unit price 402e, allocation 402f, and the like are registered in association with a code 402a. The code 402a is represented in four digits. The section 402b represents sections registered in the section 401b in the section file 401. The image link 402c represents link to image data displayed on a menu button D12a in a menu item space D12 (see FIG. 9). In the information terminals 120 and the station 105, image data is installed in the HDD 208 of each of the information terminals 102 and the HDD 307 of the station 105. In the PLU file 402, names of menu items are registered in the menu name 402d. In the PLU file 402, unit prices of the menu items are registered in the unit price 402e. Further, in the PLU file 402, allocation positions of the menu button D12a in the menu item space D12 (see FIG. 9) of the menu items are registered in the allocation 402f.

For example, as it is seen when FIGS. 6 and 7 are referred to, a code "0001" defines "blended coffee" of a section "drink" and sets a unit price "¥350". A code "0002" defines "iced coffee" of the section "drink" and sets the unit price "¥350".

Characteristic processing of the information terminal 102 according to this embodiment among kinds of processing executed by the microcomputer 201 according to the OS and the computer program installed in the HDD 208 of the information terminal 102 is explained below.

Figure 8:
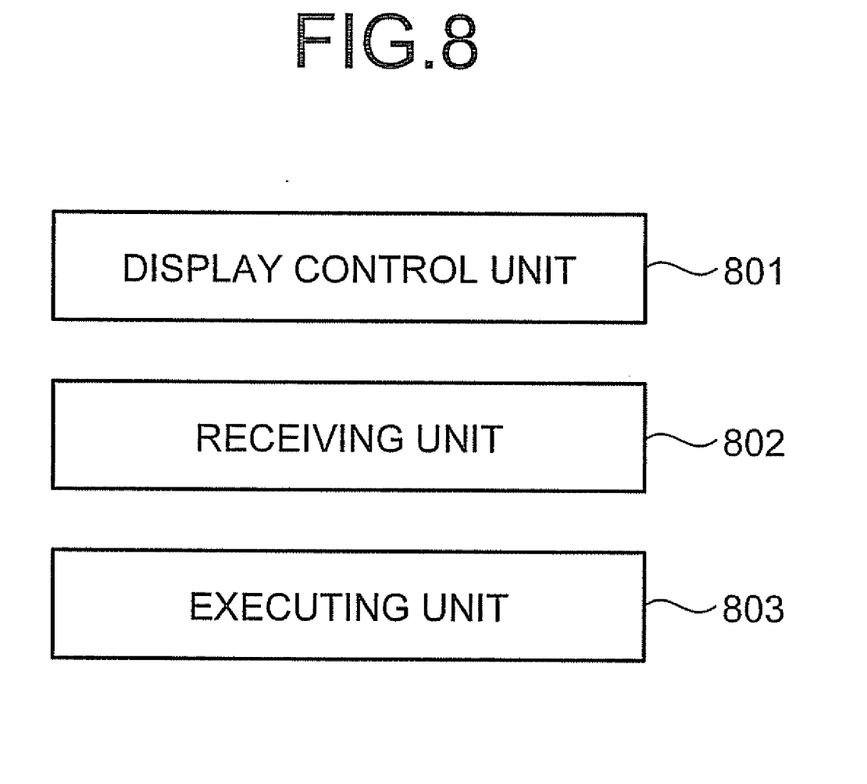
FIG. 8 is a block diagram of the functional configuration of the information terminal.

The computer program executed by the information terminal 102 according to this embodiment has a module configuration including units (a display control unit 801, a receiving unit 802, and an executing unit 803) shown in FIG. 8. As actual hardware, the CPU 202 of the microcomputer 201 reads out the computer program from the HDD 208 and executes the computer program, whereby the units are loaded onto the RAM 205 and the display control unit 801, the receiving unit 802, and the executing unit 803 are generated on the RAM 205.

Figure 9:
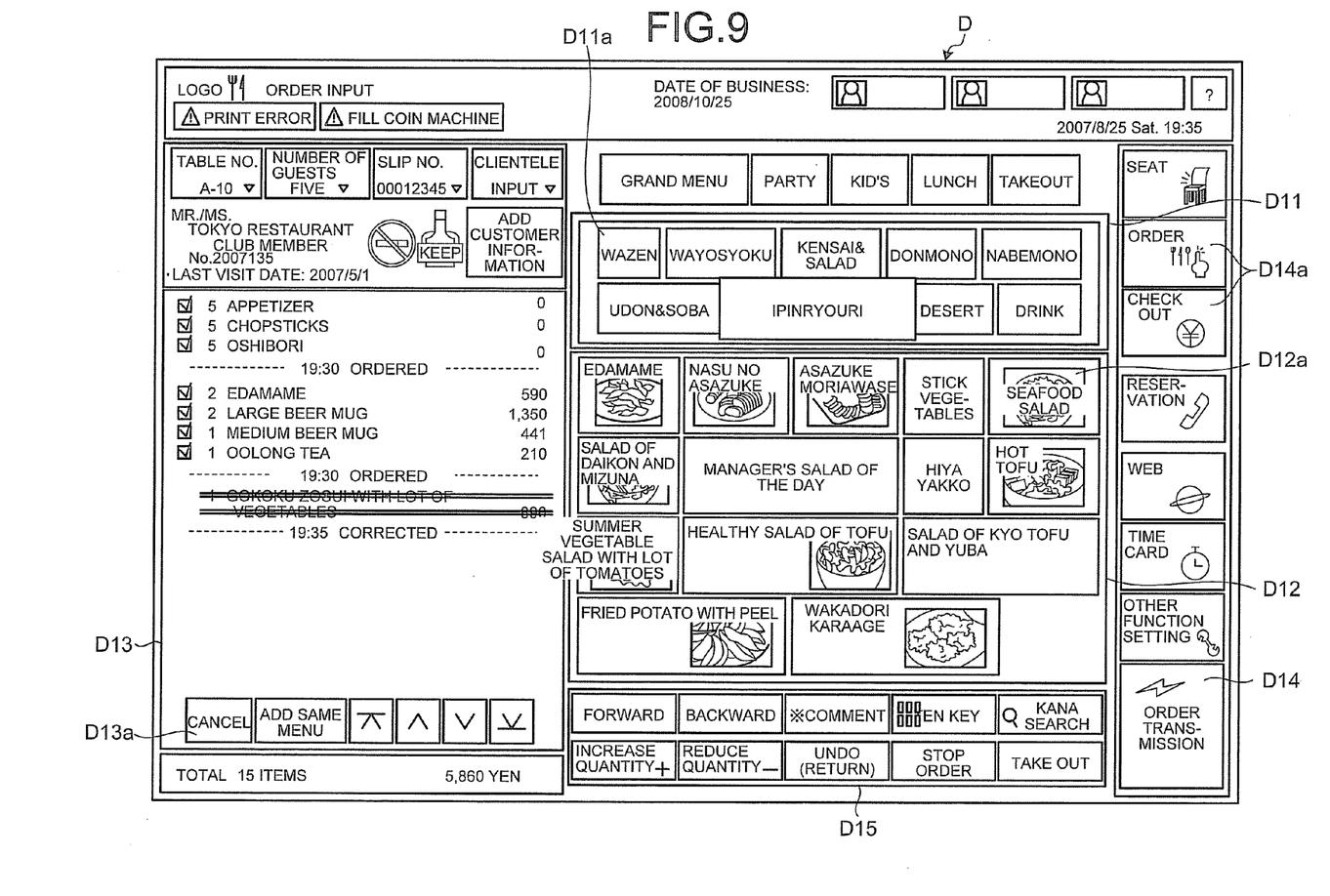
FIG. 9 is an exemplary diagram of an order input screen.

The display control unit 801 displays, on the liquid crystal display 109, the order input screen D including areas (a section tag area D11, a menu area D12, an order list area D13, and a function key area D15) in which operation images of keys and buttons for operating order jobs related to orders of menu items (e.g., a job for receiving the section 401b of a menu item to be ordered, a job for receiving an order of the menu item, and a job related to checkout processing for the ordered menu item) are displayed.

In this embodiment, the display control unit 801 displays, on the liquid crystal display 109, the order input screen D including a job designation key area D14 on which an operation image for designating a job to be executed is displayed in addition to the areas in which the operation images for operating the order jobs are displayed.

The display control unit 801 displays, in the section tag area D11, as objects that can be touch-designated on the touch panel 110, section buttons D11a that are operation images on which the section names registered in the section 401b in association with the section number 401a of the section file 401 are displayed and that are used for operating jobs for receiving the section 401b of menu items to be ordered.

The display control unit 801 displays, in the menu area D12, as objects that can be touch-operated on the touch panel 110, the menu buttons D12a that are operation images on which image data at link destinations defined by the image link 402c and item names registered in the menu name 402d in association with the code 402a of the PLU file 402 are displayed and used for operating jobs for receiving menu items to be ordered.

The display control unit 801 displays, in the order list area D13, as objects that can be touch-designated on the touch panel 110, buttons D13a that are operation images used for operating jobs related to checkout processing such as "^" and "" for viewing an order list including a menu item touch-designated on the order input screen D on the touch panel 110, the number of orders, and an amount (a unit price x the number of orders) and "cancel" for canceling an order included in the order list.

The display control unit 801 displays, in the function key area D15, as objects that can be touch-designated on the touch panel 110, keys D15a that are operation images for operating jobs related to various functions for orders of menu items such as "increase quantity" related to processing for increasing the number of orders and "reduce quantity" related to processing for reducing the number of orders.

The display control unit 801 displays, in the job designation key area D14, as objects that can be touch-designated on the touch panel 110, job designation keys D14a that are used for designating jobs to be executed such as "checkout" for designating a job related to checkout processing, "order transmission" for designating a job for transmitting an order, "order" for designating a job for receiving the section 401b of a menu item to be ordered and the menu item to be ordered, and "time card" for designating a job related to registration processing for office arrival time and office leaving time.

The receiving unit 802 is a unit configured to receive selection of jobs other than the order jobs. The receiving unit 802 receives selection of a job other than the order jobs for which the job designation key D14 displayed on the order input screen D is touch-designated.

The receiving unit 802 receives selection of a job (e.g., the job related to the registration processing for office arrival time and office leaving time) other than the order jobs. Then, as shown in FIG. 10, the display control unit 801 reduces the areas (the section tag area D11, the menu area D12, the order list area D13, and the function key area D15) in which the operation images for operating the order jobs (the section buttons D11a, the menu buttons D12a, the buttons D13a, and the keys D15a) are displayed, provides a new area (a time card area D16) on the order input screen D, and displays an operation image used for operating a received job (e.g., the job related to the registration processing for office arrival time and office leaving time), selection of which is received, on the area provided anew.

Figure 10:
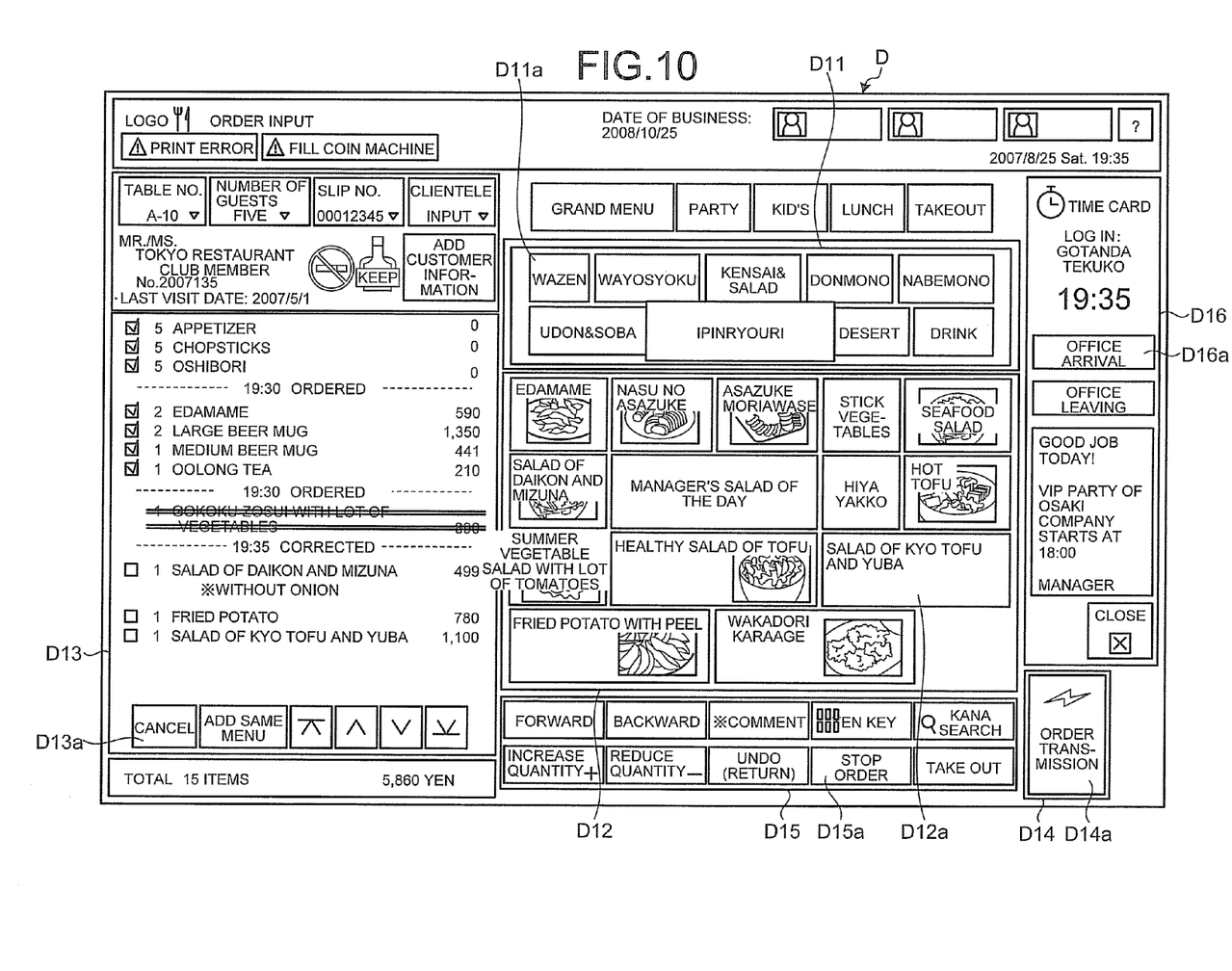
FIG. 10 is an exemplary diagram of the order input screen.

As shown in FIG. 10, the display control unit 801 reduces, according to the reduction of the areas in which the operation images for the order jobs are displayed, the operation images displayed in the areas. In this embodiment, the display control unit 801 reduces the operation images according to the reduction of the areas in which the operation images for the order jobs are displayed. However, the present invention is not limited to the reduction of the operation images. For example, the display control unit 801 may reduce the number of operation images displayed in the section tag area D11, the menu area D12, the order list area D13, and the function key area D15.

The display control unit 801 displays, in the time card area D16, as objects that can be touch-designated on the touch panel 110, buttons D16a that are operation images such as "office arrival" related to processing for registering office arrival time and "office leaving" related to processing for registering office leaving time.

In this embodiment, the display control unit 801 reduces the areas in which the operation images for the order jobs are displayed and provides the new area. However, the display control unit 801 only has to display the order input image D including the areas in which the operation images for the order jobs are displayed and the area in which an operation image of a job, selection of which is received, is displayed. For example, when an area in which the operation image of the order job is not displayed is present on the order input screen D, the display control unit 801 displays an operation image of a job, selection of which is received, in the area.

The executing unit 803 is a unit configured to execute, when an operation image is touch-designated on the touch panel 110, a job operated according to the touch-designated operation image. For example, when the section button D11a displayed in the section tag area D11 is touch-designated, the executing unit 803 executes a job for receiving a desired section out of "drink", "dessert", "wazen", "wayosyoku", "donmono", "nabemono", "udon and soba", "ipinryouri", and "kensai and salad" that is a job operated according to the operation images displayed in the section tag area D11. When the section button D11a of "ipinryouri" is touch-designated among the section buttons D11a displayed in the section tag area D11, the executing unit 803 receives the section of "ipinryouri" and requests the display control unit 801 to display the order input screen D for "ipinryouri" illustrated in FIG. 9.

When plural operation images (e.g., the menu button D12a and the button D16a) are touch-designated on the touch panel 110, the executing unit 803 executes, in parallel, a job for receiving a menu item to be ordered and a job related to the registration processing for office arrival time and office leaving time that are jobs operated according to the touch-designated plural operation images (e.g., the menu button D12a and the button D16a)

Figure 11:
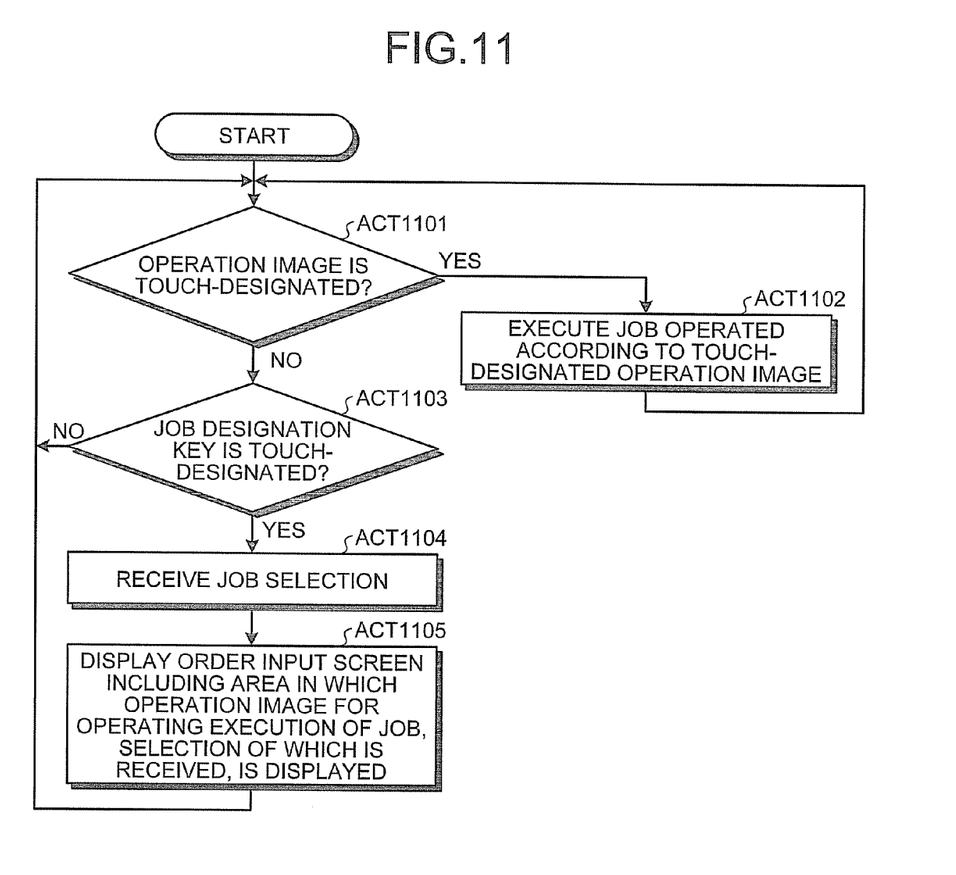
FIG. 11 is a flowchart of a flow of execution processing for a job.

Execution processing for a job via the order input screen D is explained with reference to FIG. 11. FIG. 11 is a flowchart for explaining a flow of the execution processing for a job. As shown in FIG. 11, in the execution processing for a job, if the operation image displayed in at least one of the section tag area D11, the menu area D12, the order list area D13, and the function key area D15 is touch-designated (Yes in Act 1101), the executing unit 803 executes a job operated according to the touch-designated operation image (Act 1102)

On the other hand, if the operation images displayed in the section tag area D11, the menu area D12, the order list area D13, and the function key area D15 are not touch-designated (No in Act 1101) and if the job designation key D14a displayed in the job designation key area D14 and used for receiving selection of a job other than the order jobs is touch-designated (Yes in Act 1103), the receiving unit 802 receives selection of a job designated by the touch-designated job designation key D14a (Act 1104). Subsequently, the display control unit 801 displays, on the liquid crystal display 109, the order input screen D including an area in which the operation images for operating the order jobs are displayed and an area in which an operation image for operating the job, the selection of which is received by the receiving unit 802, is displayed (Act 1105).

As explained above, according to this embodiment, when selection of a job other than the order jobs is received, the information terminal 102 displays the order input screen D including an area in which the operation images for operating the order jobs related to orders of menu items such as the job for receiving the section 401b of a menu item to be ordered, the job for receiving the menu item to be ordered, the job related to the checkout processing, and the job related to the various functions for orders of menu items are displayed and an area in which an operation image for operating the job, the selection of which is received, is displayed. Consequently, even after the order input screen D is switched to a screen for operating the job other than the order jobs, the order jobs can be operated. Therefore, operability of the information terminal 102 is high and it is possible to reduce a burden on the operator.

Further effects and modifications can be easily derived by those skilled in the art. Therefore, a wider aspect of the present invention is not limited by the specific details and the representative embodiment represented and described above. Therefore, various modifications are possible without departing from the spirit or the scope of the general concept of the invention defined by the appended claims and their equivalents.

What is claimed is:

1. An order receiving apparatus comprising:
    a receiving unit configured to receive selection of a task other than an order task related to an order of a menu item;
    a display control unit configured to display an order input screen including an area in which an operation image for operating execution of the order task is displayed and a new area in which an operation image for operating execution of the task other than the order task, the selection of which is received, is displayed, wherein
    the display control unit reduces the area in which the operation image for the order task is displayed, generates the new area on the order input screen, and displays the operation image for the task other than the order task, the selection of which is received, in the generated area; and
    an executing unit configured to execute in parallel the order task and the task other than the order task, and the area in which the operation image for operating execution of the order task is displayed and the new area in which the operation image for operating execution of the task other than the order task is displayed are simultaneously operated.

2. The apparatus according to claim 1, wherein the display control unit reduces the operation image for the order task according to the reduction of the area in which the operation image for the order task is displayed.

3. The apparatus according to claim 1, wherein the display control unit displays, as an input device, the order input screen in a display unit in which a touch panel is laminated and arranged on a display surface.

4. The apparatus according to claim 3, wherein the display unit is a liquid crystal display.

5. An order receiving method comprising:
- receiving selection of a task other than an order task related to an order of a menu item;
- displaying an order input screen including an area in which an operation image for operating execution of the order task is displayed and new area in which an operation image for operating execution of the task other than the order task, the selection of which is received, is displayed;
- reducing the area in which the operation image for the order task is displayed, generating a new area on an order input screen, and displaying the operation image for the task other than the order task, the selection of which is received; and
- executing in parallel the order task and the task other than the order task, and the area in which the operation image for operating execution of the order task is displayed and the new area in which the operation image for operating execution of the task other than the order task is displayed are simultaneously operated.

6. The method according to claim 5, further comprising reducing the area in which the operation image for the order task is displayed, generating a new area on the order input screen, and displaying the operation image for the task, the selection of which is received, in the generated area.

7. The method according to claim 6, further comprising reducing the operation image for the order task according to the reduction of the area in which the operation image for the order task is displayed.

* * * * *